United States Patent Office 3,372,139
Patented Mar. 5, 1968

3,372,139
PREPARATION OF CROSS-LINKABLE
POLYOLEFIN COMPOSITIONS
Erich Behr, Troisdorf, and Rolf Beckmann, Siegburg, Germany, assignors to Dynamit Nobel Aktiengesellschaft Troisdorf, Bezirk Cologne, Germany, a corporation of Germany
No Drawing. Filed Sept. 7, 1965, Ser. No. 485,575
Claims priority, application Germany, Sept. 8, 1964,
D 45,368
11 Claims. (Cl. 260—41)

ABSTRACT OF THE DISCLOSURE

An additive, for example, carbon black, and a cross-linking agent, and a polyolefin polymer are combined in a mixture, preparatory to further treatment, such as for example cross-linking, by the steps of (1) heating a mixture of the additive and polyolefin to sinter the mixture, (2) cooling the sintered polymer, and (3) dispersing the cross-linking agent in the cooled sintered polymer.

---

Thermosetting polyethylenes and other polyolefins and olefin copolymers generally contain peroxide cross-linking agents, carbon black or other fillers, and are worked by compression, injection or extrusion procedures to form products having a number of excellent mechanical, thermal and chemical properties.

The methods described are applicable to polyolefin polymers, especially high pressure and low pressure polyethylene.

Of industrial interest are only products which have good uniform cross-linking. This requires an excellent distribution of the cross-linking agent and other addition substances in the polymer. A good distribution of the cross-linking agent, however, is difficult to obtain. The use of a solvent is not possible, since suitable solvents cannot be economically removed from the polymers. In the known methods, the peroxide is therefore incorporated by customary mixing apparatus, such as roller mills and mixing kneaders. It is added last and when the polymer has been heated to a temperature above its softening point. The temperatures required for this purpose are generally between 120° C. and 150° C., and, as a result of high filler contents, even higher.

In accordance with known methods, the cross-linking agents are peroxides, more particularly, di-alkyl (aryl)-peroxides of the structure

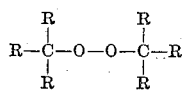

in which R is any substituted alkyl or aryl radical. These products, however, decompose perceptibly into radicals at temperatures of more than 120° C. Cross-linking occurs upon incorporation of the peroxide, and this brings about a stiffening of the mass. This interferes with good distribution of the peroxide. By the resulting increase in the viscosity, the internal friction of the mass is also increased, and an uncontrolled rise in temperature occurs. This, in turn, causes an acceleraton of the decomposition of the peroxide. This secondary reaction builds up to so-called "scorching."

The temperature range of the compounding is very narrow. Long compounding times result in good distribution, but cause pre-cross-linking, so that the material is difficult to process, or is scorched, while short mixing times result in non-homogeneous distribution.

It has now been found that the said difficulties can be avoided by sintering the mixture of the starting products first, without peroxide, in a rapidly rotating (high speed) eddy mixer by heating and only then adding the cross-linking agent in a second cooling mixer.

The method is predominantly suited for the cross-linking of polyolefins or polyolefin copolymers or mixtures thereof, such as polyethylene, polybutylene, polypropylene and polyethylene-polypropylene, polyethylene/polybutylene, and polyethylene/polyvinyl acetate copolymers, etc.

The method of the invention can also be carried out in the presence of additives such as fillers and reinforcing agents, plasticizers and lubricants, pigments and dyestuffs, antioxidants and ultraviolet light absorbers, activators and accelerators.

As fillers, there can also be used large quantities of carbon black, graphite, $SiO_2$, silicates, carbonates, phosphates, powdered metals and the like. The quantity depends on the purpose for which the future parts are to be used. The method affords particular advantages for the use of large quantities of filler, of 10 to 60 percent by volume and preferably 20 to 40 percent by volume, referred to the total mass.

As cross-linking agents, the known agents can be used, preferably peroxides of the di-aryl (alkyl)-peroxide type, such as dicumyl peroxide, di-t-butyl peroxide, di-t-amyl peroxide, 2,5-dimethyl-2,5-di-(t-butyl peroxide)-hexane, etc., in quantities of 1 to 6 percent by weight of the polyolefin.

The polyethylene, preferably in powdered form, is heated together with all other addition substances, carbon black, fillers, stabilizers, accelerators, etc., except for the peroxides, in a rapidly rotating eddy mixer up to a so-called "sinter point" which is in the vicinity of the softening point of the corresponding polymer but is determined by a very large number of factors, such as the nature and composition of the compound, the rate of heating, the characteristics of the mixer, the height of filling, etc. This "sinter point" can be determined very precisely in each individual case by the power consumed by the mixer. The current consumption (ampere number) of the mixer increases slightly to below the sinter point and then suddenly increases sharply. At this time, the mixture is discharged with continuous agitation into a second mixer which is cooled to cold-water temperature, and the mixture is cooled with strong agitation and is then treated with the cross-linking agent, in the second mixer.

The method—in which no scorching is to be observed—has the further advantage that the cross-linking agent can be added in dissolved form to the mixture and therefore dispersed very fine.

For this purpose, there are used readily volatile solvents which are good solvents for the peroxides, without swelling polyethylene or being retained by polyethylene, such as for instance ether, acetone, alcohol, etc.

If the peroxide is added as solid, it is advisable to operate at temperatures which lie above the softening point of the peroxide. Finely pulverulent, solid peroxides can also be added below their softening point. Liquid peroxides are added in pure form or as solution. If the peroxide is added in solution, it is introduced at a time when the mixture still has not dropped below the boiling point of the solvent, so that the solvent is expelled during the dispersing of the cross-linking agent.

The present method also makes possible the use of readily volatile peroxides which could be used only with large losses, if at all, heretofore. For example, di-t-butylperoxide and di-t-amyl-peroxide are exceptionally volatile. The method of the invention makes it possible to produce strongly cross-linked products even with these peroxides.

Another advantage of the method of the invention is that the eddy mixer can be filled in simple manner with nitrogen, whereby oxidation of the polyolefin upon the heating is avoided. As is known, the oxidation which occurs in the methods described reduces the degree of cross-linking and thus the strength of the products and leads to phenomena of sticking.

Another advantage of the method described is that the compounds obtained in the two eddy mixers can be processed further without additional homogenizing or plasticizing.

Thus, it is possible to produce plates and shaped parts of good quality from this sinter compound in the thermosetting process or transfer molding process. The parts produced in this manner from for instance cross-linked low-pressure polyethylene/carbon black mixtures no longer have a granulate structure on the compressed part, such as is frequently to be observed on parts compressed in the customary manner from granulate. Granulates produced in accordance with the known method are generally in an already pre-cross-linked condition so that even with the application of high pressure and high temperature, and particularly in the case of small flow paths, only a melting together of the edges of the granulate and no longer a homogeneous flow of the material occurs.

Another advantage of the present method consists in the fact that the further processing of the sinter compounds (plasticizing or extruding) is possible in machines which cannot be used in the previously known methods.

The difficulties with respect to the adapting of the plasticizing time and temperature which are in particular a problem of precise temperature control and therefore removal of frictional heat and heat of chemical reaction (by the exothermal decomposition of peroxide) have already been described. For the reasons indicated, roll mills but not continuous kneaders, such as bus kneaders or mixtruders can be used for instance for the compounding of a low pressure polyethylene/carbon black mixture.

This is readily possible with the sinter compounds of the invention containing the cross-linking agent (i.e. the sinter compounds of the invention can be worked on roll mills, bus kneaders, and mixtruders) since the conditions in the kneading apparatus can be so adjusted that only a very small plasticizing zone is produced, which is readily traversed without cross-linking by the material. The homogeneity of the parts then obtained in any desired thermosetting shaping process is established by the fine dispersion of peroxide obtained in the sinter-mixing process. The same is true for extrusion to form tubes and sections, for cable sheathing, etc.

*Example I*

A mixture of 65 percent by weight of low-pressure polyethylene in the form of a powder as is produced in a polymerization process (density 0.95, reduced viscosity 2.5; melt index $i_5=1.5$) was heated with 35 percent by weight g.p.f. carbon black within 10 minutes in an eddy mixer to about 130° C. (measured in a wing of the mixer) with strong mixing, and with circulation of heating fluid through the mixer jacket, whereupon a sudden increase in the ampere-consumption occurred and the mixture was immediately discharged into a high-speed cooling mixer (also an eddy mixer) which is cooled to about 15° C. Cooling medium is circulated through the jacket. At about 60° C. (also measured in a wing of the mixer) a solution of 4 percent by weight (referred to the polyethylene) of dicumyl peroxide dissolved in five times its quantity of diethyl ether is added to the high-speed mixer.

If, for instance, a 500 liter eddy mixer which makes possible the production of about 80 kg. of material is used for this process including the addition of cross-linking agent, there is required for the compounding process only about ⅛ of the time which is necessary for the plasticizing and mixing on mixing rolls of comparable size (950 mm. length and 450 mm. diameter).

It is not possible to avoid cross-linking of this batch, which was selected due to its particular difficulty on a Banbury or bus kneader or a mixtruder. On the other hand, the sinter compound containing the cross-linking agent can be processed further in the extruder or bus kneader, the machine being so adjusted that a temperature of the composition of 145° C. is reached, the plasticizing zone being not larger than 20 cm. and the material travel time through said zone being within a period of time of 2 to 5 minutes.

The sinter compound containing cross-linking agent can be used without further pre-compression in the compression and transfer molding process. A comparison of the measured values of compressed plates (180° C., 150 kg./cm.² pressure and about 1 minute hardening time per mm. of wall thickness) is shown in Table I. In the table, "unplasticized" means that the sinter compound containing cross-linking agent is compressed directly into plates; "after plasticized" means that such compound is first plasticized on a roll mill and then compressed into plates.

TABLE I.—BATCH IN ACCORDANCE WITH EXAMPLE I

| | Unplasticized | After Plasticized | Production on rolls (prior art) |
|---|---|---|---|
| Tensile strength (kg./cm.²) 20° C. | 285 | 295 | 320 |
| Elongation, percent | 70 | 65 | 70 |
| Tensile strength (kg./cm.²) 90° C. | 100 | 100 | 100 |
| Elongation, percent | 60 | 120 | 70 |
| Impact strength, 0° | 31 | 38 | 35 |
| (U-notch), −30° | 26 | 44 | 36 |
| (Cmkg./cm.²), −50° | 23 | 29 | 28 |
| Swelling value (percent) | 110 | 66 | 70 |
| Dissolving value (percent) | 5 | 4 | 4 |

From this table it can be seen that the method of the invention, when using a non-volatile peroxide leads, with greatly decreased compounding time and greater possibility of further processing, to the same quality of products as obtained by a method corresponding to the prior art.

*Examples II and III*

By the method described in Example I, two batches were treated, di-t-butyl peroxide and di-t-amyl peroxide being used without ether instead of the dicumyl peroxide. The table shows a comparison with the products obtained by the customary roll method.

TABLE II

| | Di-t-butyl rolling method | Peroxide Method claimed | Di-t-amyl rolling method | Peroxide Method claimed |
|---|---|---|---|---|
| Tensile strenght (kg./cm.²) 20° C. | 300 | 310 | 295 | 285 |
| Elongation | 205 | 110 | 100 | 90 |
| Tensile strength (kg./cm.²) 90° C. | 50 | 110 | 60 | 100 |
| Elongation, percent | 500 | 110 | 480 | 105 |
| Impact strength, 0° | 4 | 35 | 4 | 37 |
| (U-notch), −30° | 3 | 34 | 3 | 41 |
| (kg./cm.²), −50° | 2 | 34 | 3 | 37 |
| Swelling value (percent) | Boiled | 96 | Boiled | 102 |
| Dissolving value (percent) | Boiled | 5 | Boiled | 6 |

*Example IV*

65 percent by weight of high-pressure polyethylene granules (density 0.92) were heated with 35 percent by weight thermal black at about 125° C. within a period of 10 minutes with strong mixing in an eddy mixer. The appropriate time for transfer to the cool mixer, with allowance for the time required for the transfer into the cool mixer, can be determined by tests. The transfer is then effected when the material has reached the sinter point. If this time is exceeded, the apparent density changes only slightly, but the entire mixture begins to lump strongly.

Dicumyl peroxide was added to the cooling mixer, as described in Example I.

This sinter compound can be processed with or without the described after-compression on a normal cable sheathing extruder to form a cable sheathing having a smooth surface. This smooth surface is retained even upon a hardening of the cable by hot air, live steam or some other type of heating at temperatures between 150 and 250° C., while a compound produced in the customary manner gives rough surfaces, due to the presence of partially linked places.

Thus, the invention provides a method of combining a cross-linking agent and other additives with polyolefin polymer to provide a polyolefin polymer composition containing cross-linking agent and the other additives for subsequent processing, wherein cross-linking occurs. The invention involves heating and mixing a mixture of the polymer and the said other additives in the absence of the cross-linking agent to sinter the mixture and distribute the said other additives in the polymer. At the sintering point, the heating is interrupted, and thereafter the material is cooled. Following the cooling, cross-linking agent is dispersed in the material. The temperature, at which the peroxide is added, need only be lower than its decomposition temperature. The temperature at which the introduction is made is dependent on various factors: melting point of the peroxide, boiling point of a solvent or emulsifying agent that may be employed, etc., and can readily be determined for the system in question.

For the production of the materials described according to the invention, three requirements are to be postulated, which according to prior art processes, could not be accomplished simultaneously:

(A) homogeneous distribution of the addition substances, except the peroxide;
(B) homogeneous distribution of the peroxide without scorching;
(C) easy processability of the final compound in customary plastic-processing machines, according to well known plastic-processing methods.

Requirement A, for example, when taken separately, may be accomplished by various known methods, however, in the prior art, cannot be achieved in combination with requirements B and C. The crux of the invention resides, in addition to the economic advantage obtained, in the accomplishment that several problems may be solved simultaneously. Whereas, on the other hand, it is possible to solve each individual problem separately in a different manner, the alternatives necessitate the employment of comparatively complicated procedures. The resolution of the aforesaid problems is, however, dependent on the employment of the type of mixer.

The eddy mixer used is a "Wirbelmischer" or "Fluid-Mischer" (see Wittforth, Kunststoff-Technisches Wörterbuch (Manual for Plastic Techniques) German-English, page 95). In the eddy mixer, pulverulent to granulated materials are thoroughly mixed, as is done with liquids, whereby a rotating pin- or blade ring is arranged underneath a firmly affixed pin- or blade ring at the bottom of a vertically positioned drum, and is rotating with high rotation speed ($\leq 60$ m./sec.). This type of mixer is also described in Schulz, "Die Kunststoffe" (the plastics). These mixers are commercially available for instance under the names "Henkel-Mischer" or "Diosna-Mischer."

The mixer in which the additives other than cross-linking agent, and the mixer in which cooling is effected and cross-linking agent is added are the same. The heaters are provided with a jacket for circulation of heating or cooling medium.

Whereas the invention has been described with respect to particular embodiments thereof, these embodiments are merely representative, and do not serve to set forth the limits of the invention.

What is claimed is:

1. The method of combining a cross-linking agent and other additive with polyolefin polymer to provide a polyolefin polymer composition containing cross-linking agent and the other additives for subsequent processing, wherein cross-linking is effected, which comprises:
   (a) heating and mixing a mixture of the polymer and said other additive in the absence of the cross-linking agent to sinter the mixture and distribute the said other additive in the polymer;
   (b) interrupting the heating at the sintering point, and thereafter
   (c) cooling the sintered polymer, and thereafter
   (d) dispersing the cross-linking agent in the cooled polymer.

2. Method according to claim 1, said heating and mixing being performed in an eddy mixer, and said dispersing of the cross-linking agent being performed in an eddy mixer.

3. Method according to claim 2, the said other additive including carbon black.

4. Method according to claim 3, said carbon black being 10 to 60 percent by volume of the total mass of polymer plus the other additives.

5. Method according to claim 2, the polymer being polyethylene.

6. Method according to claim 2, the cross-linking agent being a peroxide.

7. Method according to claim 6, the peroxide being a readily volatile peroxide.

8. Method according to claim 6, the peroxide being di-t-butyl peroxide, di-t-amyl peroxide or a mixture thereof.

9. Method according to claim 1, wherein said sintering is effected by mixing and heating the polymer and other additive in an electrically powered mixer, said heating being to a temperature in the vicinity of the softening point, and interrupting the heating and cooling the mixture upon a sudden increase in current consumption.

10. Method according to claim 9, said cross-linking agent being a peroxide, said cooling being to a temperature below the decomposition temperature of the peroxide.

11. Method according to claim 10, said cooling being to a temperature of about 60° C.

References Cited

FOREIGN PATENTS 682,691    3/1964    Canada.

OTHER REFERENCES

The Encyclopedia of Plastics Equipment, by Herbert R. Simonds, Reinhold Publishing Company, New York, pp. 356–358 TP111055, Copy in Art Unit 145.

Vulcanization of Elastomers, by Alliger and Sjothun, Reinhold Publishing Company, New York, pp. 303–304 TS1925A4, copy in Group 140.

MORRIS LIEBMAN, *Primary Examiner.*

S. L. FOX, *Assistant Examiner.*